(12) United States Patent
Petterson et al.

(10) Patent No.: US 8,132,530 B2
(45) Date of Patent: Mar. 13, 2012

(54) MILKING DEVICE

(75) Inventors: Torbjorn Petterson, Gnesta (SE);
Christoffer Hagglund, Tumba (SE);
Michael Persson, Tullinge (SE)

(73) Assignee: Delaval Holding AB, Tumba (SE)

( * ) Notice: Subject to any disclaimer, the term of this patent is extended or adjusted under 35 U.S.C. 154(b) by 578 days.

(21) Appl. No.: 11/813,552

(22) PCT Filed: Jan. 10, 2006

(86) PCT No.: PCT/SE2006/000038
§ 371 (c)(1),
(2), (4) Date: Jul. 9, 2007

(87) PCT Pub. No.: WO2006/073369
PCT Pub. Date: Jul. 13, 2006

(65) Prior Publication Data
US 2008/0202429 A1    Aug. 28, 2008

(30) Foreign Application Priority Data
Jan. 10, 2005   (SE) .................... 0500043

(51) Int. Cl.
*A01J 5/00*   (2006.01)
(52) U.S. Cl. ..................... 119/14.1
(58) Field of Classification Search ........... 119/14.01, 119/14.1, 14.08, 14.11, 14.13
See application file for complete search history.

(56) References Cited

U.S. PATENT DOCUMENTS

| | | | |
|---|---|---|---|
| 2,341,142 A * | 2/1944 | Gruenewald ........... | 119/14.24 |
| 6,269,726 B1 | 8/2001 | McNulty, Sr. | |
| 6,269,766 B1 * | 8/2001 | Birk ................. | 119/14.1 |
| 6,532,893 B1 | 3/2003 | Edholm | |
| 6,978,733 B2 * | 12/2005 | Petterson et al. ........... | 119/14.1 |
| 7,066,108 B2 * | 6/2006 | Andersson et al. ......... | 119/14.1 |
| 2004/0040512 A1 | 3/2004 | Hayne | |

(Continued)

FOREIGN PATENT DOCUMENTS

EP    0 555 895 A1    8/1993

(Continued)

OTHER PUBLICATIONS

International-Type Search Report issued May 25, 2005 by the Swedish Patent Office in Swedish Application 0500043-5, from which priority of the subject pending application is claimed.

*Primary Examiner* — Joshua J Michener
*Assistant Examiner* — Brian M O'Hara
(74) *Attorney, Agent, or Firm* — Hovey Williams LLP

(57) ABSTRACT

The invention refers to a milking device for milking an animal during a milking operation. A milking member (5) includes at least one teatcup (6) to be attached to a teat of the animal. A long milk conduit (10) extends from the milking member for being connected to a milking machine. A support device (15) comprises a mounting device (16) mounted to a stationary structure (2), and a support arm (17a) in parallel to an arm axis and connected to the mounting device. The milking member is freely movable along the support arm. The milking member is attached to the support arm and displaceable on the support arm. The support arm includes a primary arm element (17a') connected to the mounting device and a secondary arm element (17a") holding the milking member. The primary arm element is telescopically introduceable into the secondary arm element, which is displaceable on the primary arm element.

18 Claims, 3 Drawing Sheets

U.S. PATENT DOCUMENTS

2004/0200421 A1 10/2004 Andersson et al.
2004/0216679 A1 11/2004 Ealy et al.

FOREIGN PATENT DOCUMENTS

| | | |
|---|---|---|
| EP | 0 792 579 A1 | 9/1997 |
| EP | 0824858 A1 | 2/1998 |
| EP | 1 169 914 A2 | 1/2002 |
| EP | 0 900 523 B1 | 3/2002 |
| EP | 1 447 002 A1 | 8/2004 |
| GB | 1153128 A | 5/1969 |
| SE | 331611 | 1/1971 |
| WO | 98/37756 A1 | 9/1998 |
| WO | WO 02/089562 A1 | 11/2002 |

* cited by examiner

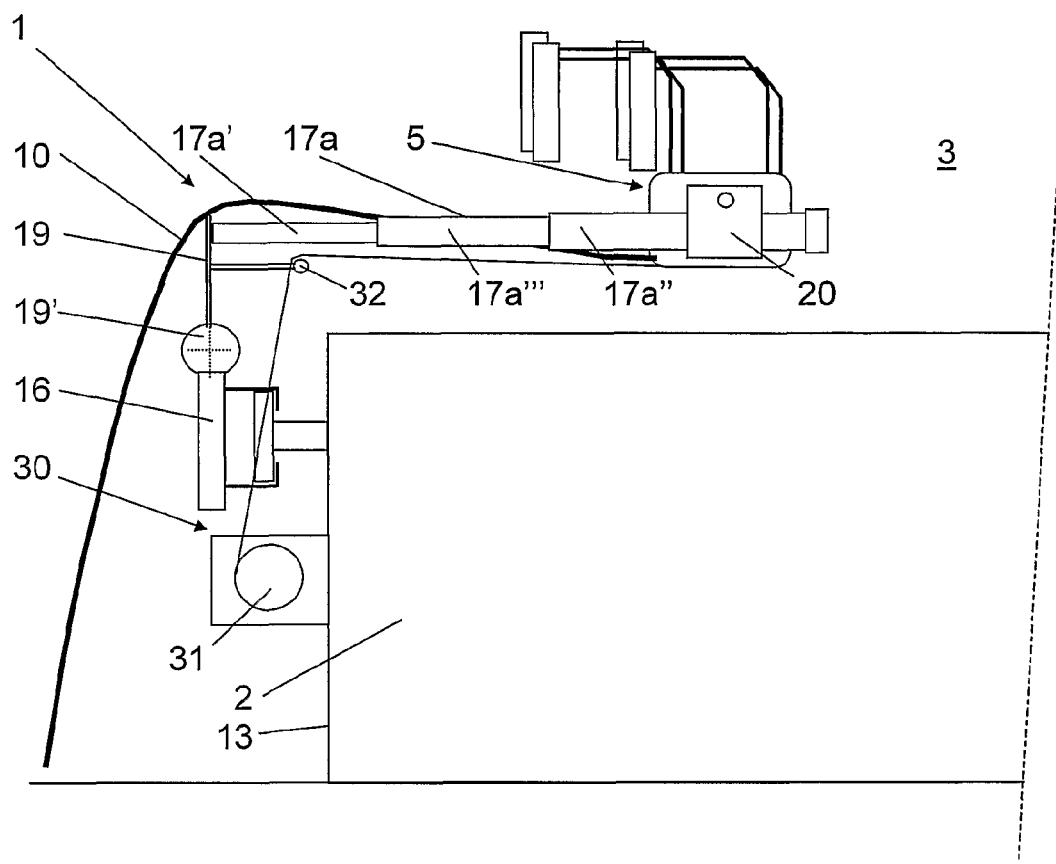

MILKING DEVICE

This is a national phase application of International Application PCT/SE2006/000038 and claiming priority from Swedish Application No. 0500043-5 filed 10 Jan. 2005, the disclosures of which are incorporated herein by reference.

THE BACKGROUND OF THE INVENTION AND PRIOR ART

The present invention refers to a milking device for milking an animal during a milking operation when milking takes place, comprising a milking member comprising at least one teatcup to be attached to a teat of the animal to be milked, at least one long milk conduit extending from the milking member and adapted to be connected to a milking machine, a support device comprising a mounting device, adapted to be mounted to a stationary structure, and a support arm extending in parallel to an arm axis and connected to the mounting device, wherein the milking member is attached to the mounting device.

There are several different milking methods known today. One differs between manual milking, where the milking operation is performed by hand, and machine milking, where the milking is performed by a milking machine. Machine milking may be semi-automatic, i.e. the teatcups are still attached manually and may be automatically removed from the teats after the milking operation is finished. Such semi-automatic milking is the most frequent method today, especially in milking arrangements comprising a large number of animals. In recent time, fully automatic milking is also used, wherein the teatcups are attached in an automatic manner to the teats of the animal to be milked, which means that no manual operation is any longer needed.

This invention refers to an arrangement to be operated in the first place according to the semi-automatic milking method. In such an arrangement, the attachment of the teatcups is still a rather heavy and time-consuming work. The operator has to move the teatcups to a position beneath the teats and to lift the teatcups for the attachment of the teatcups to the teats.

WO02/089562 discloses a device for carrying a milking member. The milking member comprises a set of teatcups and is, via a flexible conduit member, connectable to a milking machine. A support element is fixedly mounted to or at a milking parlour arranged to receive an animal to be milked. An arm arrangement is pivotably connected to the support element and arranged to support the milking member at least in connection with the application of the teatcups to the teats of the animal. The arm arrangement is movable from a first position in which the milking member is located beside said animal, to a second position, in which the milking member is located beneath the animal. The arm arrangement comprises a telescope arm with a first outer arm element which carries the milking member and is displaceable in a second arm element connected to the support element.

U.S. Pat. No. 6,532,893 discloses a support device for carrying a set of teatcups to be applied by an operator to the teats of an animal to be milked. The support device comprises an arm with a carrying member on which the teatcups are mounted. The carrying member is adapted to be moved from an inactive position, in which the teatcups are located beside the animal and to an active position, in which the teatcups are located more closely to the teats of the animal than in the inactive position. The active position permits the operator to apply the teatcups to the respective teat. The support device is adapted to be moved manually. A pneumatic cylinder may be provided for the raising and lowering of the arm with the carrying member.

SUMMARY OF THE INVENTION

The object of the present invention is to provide a milking device to be operated according to the semi-automatic milking method. A further object of the present invention is to improve the semi-automatic milking and to facilitate the manual attachment of the teatcups to the teats of an animal to be milked. A further object of the present invention is to provide a milking device enabling a more efficient manual attachment of the teatcups to the teats of the animal to be milked.

This object is achieved by the milking device initially defined, which is characterized in that the milking member during the milking operation is freely movable along the arm axis.

By such a milking device the milking member comprising the teatcup or teatcups may be freely movable along the arm axis from a position next to the animal to a position beneath the teats. Such a moving of the milking member is easy to perform and does not require any heavy lifting of the milking member. The initial part of the attachment work is thus significantly facilitated. After the movement of the milking member, the teatcups can be slightly lifted to be attached to the respective teat. It is to be noted that the arm axis may not only extend along a straight line but may also be at least slightly curved.

According to an embodiment of the invention, the support arm provides a first inner position relatively close to the mounting device and a second outer position relatively far away from the mounting device, wherein the milking member is freely movable between the first inner position and the second outer position.

According to a further embodiment of the invention, the milking member is attached to the support arm in a rest position and an active milking position during the milking operation when milking takes place. Consequently, the milking member remains attached to the support arm during the whole milking operation. Such a remaining attachment of the milking member to the support arm is facilitated by the movability of the support arm with respect to the mounting device and by the movability of the milking member along the arm axis.

According to a further embodiment of the invention, the support arm is connected to the mounting device to be movable with respect to the mounting device in order to be positionable in at least the rest position and the active milking position. The support arm may thus be rotatable, for instance, from a rest position next to the animal, i.e. substantially laterally beside or longitudinally behind the animal, to an active milking position substantially straight beneath the animal. The support arm may be rotatable in a vertical plane, a horizontal plane or an inclined plane.

According to a further embodiment of the invention, the milking member is adapted to be positioned in the proximity of the first inner position when the support arm is in the rest position and in the proximity of the second outer position end when the support arm is in the active milking position.

According to a further embodiment of the invention, the moving of the support arm from the active milking position to the rest position is facilitated by the movement of the milking member from the first inner position to the second outer position due to a displacement of the centre of gravity of the milking member, the support arm and the long milk conduit.

Advantageously, the milking device may comprise a force element exerting a force acting on the support arm to facilitate the moving of the support arm from the active milking position to the rest position. For instance, the displacement of the centre of gravity may be sufficient to enable the force element to accomplish the movement of the support arm from the active milking position to the rest position. The force element may comprise a spring or any other suitable force-exerting member.

According to a further embodiment of the invention, the milking member is attached to the support arm by engaging means engaging directly the milking member, i.e. not via the long milk conduit.

According to a further embodiment of the invention, the milking member is attached to the support arm in such a way that the milking member is displaceable on the support arm along the arm axis.

According to a further embodiment of the invention, the engaging means comprises a slide member holding the milking member and being attached to the support arm to be displaceable along the arm axis. In such a way the movability of the milking member in relation to the support arm may be obtained in an easy and proper way. Furthermore, the milking member may be pivotal around a pivot axis. Advantageously, the milking member may then be mounted to the slide member in such a way that the milking member is pivotal around the pivot axis. The pivot axis may extend at an angle to the arm axis.

According to a further embodiment of the invention, the long milk conduit extends from the milking member beside the support arm.

According to a further embodiment of the invention, the support arm comprises a primary arm element connected to the mounting device and a secondary arm element holding the milking member, wherein the primary arm element is telescopically introduceable into the secondary arm element, and wherein the secondary arm element is displaceable on the primary arm element along the arm axis. In such a way the total stroke length of the milking member in relation to the stationary mounting device is further prolonged. The milking member may thus be located beside or behind the animal when the milking member is in at least the proximity of the first inner position, and substantially straight beneath the teats of the animal when the milking member is in at least the proximity of the second outer position.

According to a further embodiment of the invention, the support arm comprises a first arm and a second arm, wherein the first arm and the second arm both extend in parallel to the arm axis. By providing the support arm with two such arms, the strength of the support arm may be improved. The slide member is then preferably mounted to the first arm and the second arm to be carried by both arms and to be displaceable along the arm axis.

According to a further embodiment of the invention, both the first arm and the second arm comprise a respective primary arm element connected to the mounting device and a respective secondary arm element holding the milking member, wherein the primary arm elements are telescopically introduceable into the secondary arm elements, and wherein the secondary arm elements are displaceable on a respective one of the primary arm elements in parallel to the arm axis.

According to a further embodiment of the invention, the milking member comprises a claw and a set of teatcups each having an opening for permitting introduction of a respective teat of the animal to be milked. Advantageously, the teatcups are connected to the claw by means of a respective short milk conduit, wherein each short milk conduit has such a stiffness that the teatcups are maintained in a position with the openings turned substantially upwards prior to the milking operation when the claw is below an udder of the animal. Furthermore, each short milk conduit may have a first substantially straight portion connected to the claw and a second substantially straight portion connected to the respective teatcup, the first straight portion being approximately perpendicular to the second straight portion.

BRIEF DESCRIPTION OF THE DRAWINGS

The present invention is now to be explained more closely by means of a description of various preferred embodiments and with reference to the drawings attached hereto.

FIG. 5 discloses a second embodiment of a milking device according to the invention.

DETAILED DESCRIPTION OF VARIOUS EMBODIMENTS OF THE INVENTION

FIGS. 1 to 4 disclose a first embodiment of a milking device 1 for milking an animal during a milking operation. The milking device 1 is provided in a stationary structure 2 in the form of a milking stall. The milking stall comprises at least one milking parlour 3 for receiving at least one animal to be milked. The milking stall may comprise a large number of milking parlours 3 or milking boxes arranged in any preferred configuration. Each milking parlour 3 is adapted to house one or more animals for milking of the respective animal during a respective milking operation.

Figure 1:
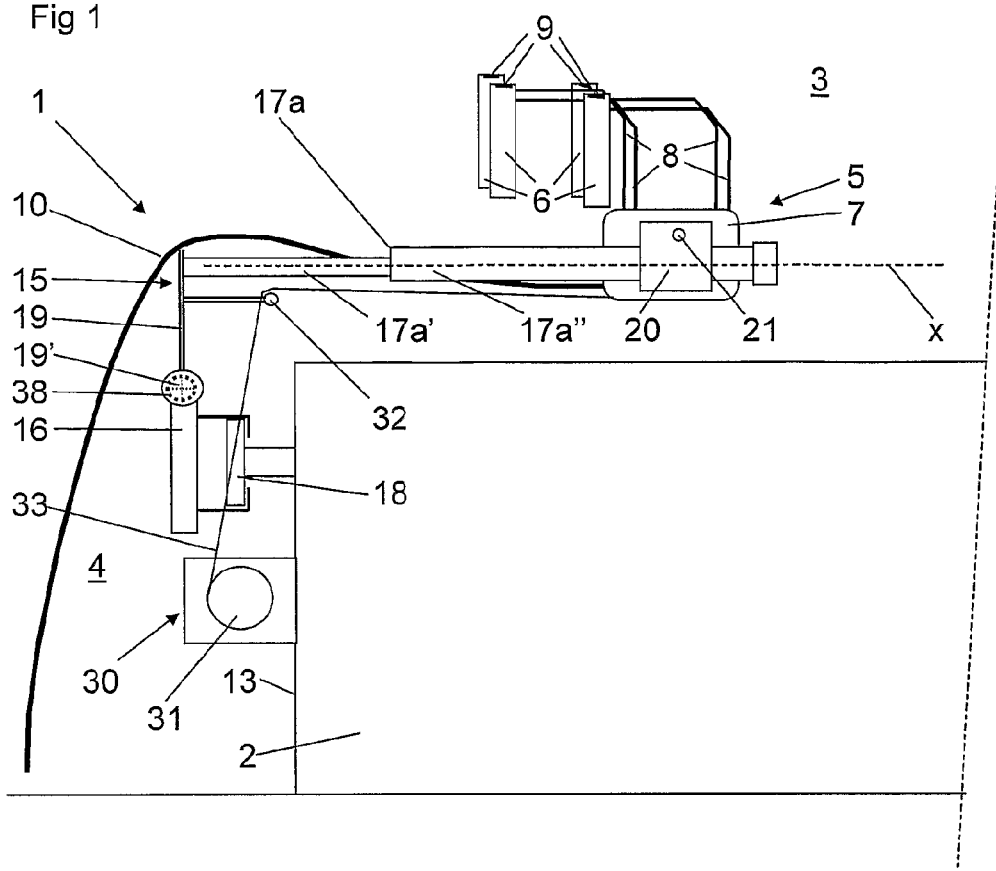
FIG. 1 discloses schematically a side view of a first embodiment of a milking device according to the invention in an active milking position.

The milking device 1 comprises a milking member 5 comprising at least one teatcup 6 to be attached to a teat of the animal to be milked. In the embodiments disclosed, the milking member 5 comprises a claw 7 and four teatcups 6. Each teatcup 6 is connected to the claw 7 via a respective short milk conduit 8. Each teatcup 6 defines an inner space for receiving a respective teat and has an upper opening 9 permitting the introduction of the teat into the inner space of the teatcup 6. Each short milk conduit 8 has such a stiffness that the teatcups 6 are maintained in a position with the openings 9 turned substantially upwards also when the teatcups 6 are not attached to the teats of the animal and the claw is in a substantially horizontal position as shown in FIG. 1. As can be seen in FIG. 1 each short milk conduit 8 is attached to the respective teatcup 6 at an upper part of an outer side surface of the teatcup 6. Each short milk conduit 8 has a first substantially straight portion connected to the claw 7 and a second substantially straight portion connected to the respective teatcup 6. The first straight portion is approximately perpendicular to the second straight portion. In the position disclosed in FIG. 1, the first straight portion extends substantially vertically and the second straight portion extends substantially horizontally. A long milk conduit 10 extends from the milking member 5. In the embodiment disclosed in FIGS. 1-4, the long milk conduit 10 is attached to and extends from the claw 7. The long milk conduit 10 is adapted to be connected to a milking machine (not disclosed) in a manner known per se. It should also be noted that each teatcup 6 in a conventional manner comprises a pulsation chamber (not disclosed) connected to a pulsator (not disclosed) via pulse conduit (not disclosed), which could be a separate conduit or a conduit integrated in the short milk conduit 8 and/or the long milk conduit 10. The milking device 1 also comprises a support device 15. The support device 15 comprises a mounting device 16 and a support arm 17a, 17b. The support arm 17a, 17b has an elongated shape and extends in parallel to an arm axis x. The mounting device 16 is adapted to be fixedly of movably mounted to the stationary structure 2. In the embodiments disclosed, the stationary structure 2 comprises a rail element 18 provided outside the milking parlour 3 and mounted to a substantially vertical wall 13 next to and beneath the milking parlour 3. The rail element 18 extends in parallel to or along a horizontal or substantially horizontal rail axis r. It should be noted that the rail axis r could be inclined with respect to a horizontal line. The mounting device 16 is mounted to the rail element 18 to be freely movable on the rail element 18 along the rail axis r at least during the milking operation.

The support arm 17a, 17b is connected to the mounting device 16 via a connecting member 19. The support arm 17a, 17b is movable with respect to the mounting device 16. In the embodiments disclosed, the support arm 17a, 17b is rotatable in a vertical plane with respect to the mounting device 16. This possibility of rotation of the support arm 17a, 17b is accomplished by means of a rotary joint 19' of the connecting member 19. The connecting member 19 is thus mounted to the mounting device 16 by means of the rotary joint 19'.

The milking member 5 is attached to the support arm 17a, 17b and is at the same time freely movable along the arm axis x. This movability is accomplished in two ways. The milking member 5 is displaceable on the support arm 17a, 17b along the arm axis x. The milking device 1 may then comprise a slide member 20, which holds the milking member 5 and is slideably attached to the support arm 17a, 17b to be displaceable along the arm axis x. More specifically, as can be seen from the figures, the slide member 20 holds the claw 7 via two pins 21 attached to the claw 7 and extending through corresponding holes extending through two flange members 22 provided on the slide member 20. The claw 7 is pivotal with respect to the slide member 22 by means of the pins 21. More specifically, the claw 7 is pivotal around a pivot axis p extending in parallel to the pins 21. In the embodiments disclosed, the pivot axis p extends at a substantially right angle in relation to the arm axis x. The flange members 22 are elastically flexible so that the claw 7 and the milking member 5 can be easily detached from the slide member 20 by bending the flange members 22 outwardly.

The support arm 17a, 17b comprises a primary arm element 17a', 17b' connected to the mounting device and a secondary arm element 17a", 17b" holding the milking member 5. The movability of the milking member 5 is also accomplished by the feature that the primary arm element 17a', 17b' is telescopically introduceable into the secondary arm element 17a", 17b" so that the secondary arm element 17a", 17b" is displaceable and freely movable on the primary arm element 17a', 17b' along the arm axis x. The support arm 17a, 17b has an inner end connected to the mounting device 16 and an opposite outer end. The milking member 5 is thus displaceable on the support arm 17a, 17b between a first inner position in the proximity of the inner end, see FIG. 4, and a second outer position in the proximity of the outer end, see FIG. 1. Furthermore, the support arm 17a, 17b is, as mentioned above, connected to the mounting device 16 to be movable with respect to the mounting device 16 in order to be positionable in at least a rest position shown in FIG. 4 and an active milking position shown in FIG. 1.

Figure 2:
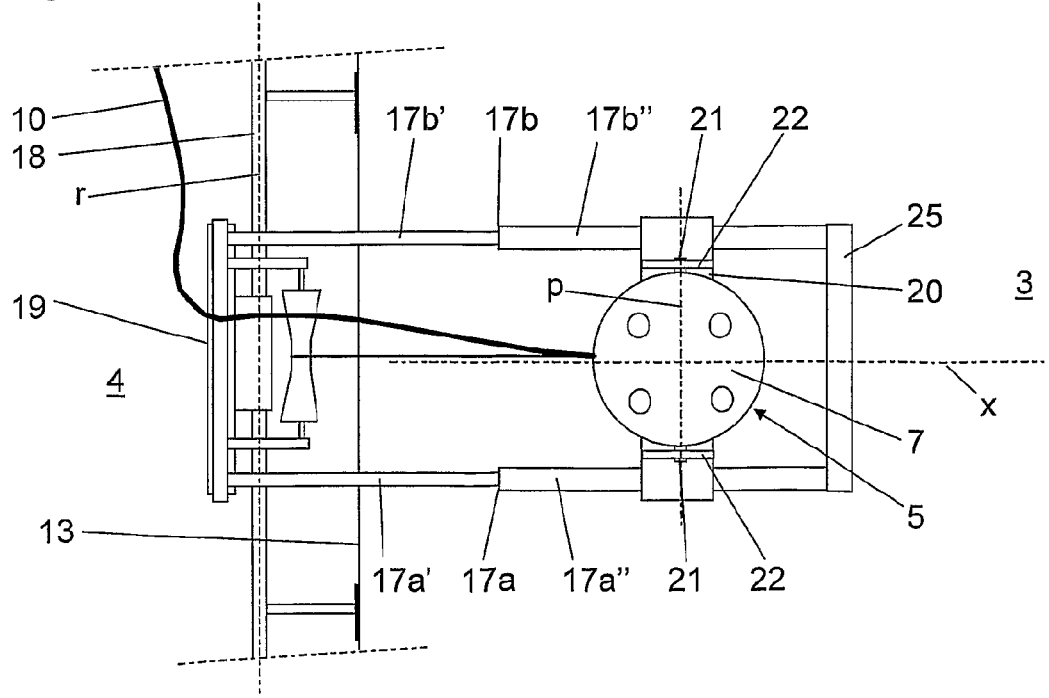
FIG. 2 discloses a view from above of the milking device in FIG. 1 in an intermediate position.

As can be seen from FIG. 2, the support arm 17a, 17b may comprise a first arm 17a and a second arm 17b. The teatcups 6 and the short milk conduits 8 are not disclosed in FIG. 2. Both the first arm 17a and the second arm 17b extend in parallel to each other and to the arm axis x. Both the first arm 17a and the second arm 17b are at the inner ends connected to the mounting device 16 via the connecting element 19. At the outer ends the first arm 17a and the second arm 17b are connected to each other via a connecting rod 25. The long milk conduit 10 extends beside the support arm 17a, 17b and in the first embodiment, the long milk conduit 10 extends between the first arm 17a and the second arm 17b. The slide member 20 is mounted to the first arm 17a and the second arm 17b to be displaceable along the arm axis x. Both the first arm 17a and the second arm 17b comprise a respective primary arm element 17a', 17b' connected to the mounting device 19 and a respective secondary arm element 17a", 17b" holding the milking member 5. The primary arm elements 17a', 17b' are telescopically introduceable into the secondary arm elements 17a", 17b" in such a way that the secondary arm elements 17a", 17b" are displaceable on the respective primary arm element 17a', 17b' in parallel to the arm axis x.

The milking device 1 also comprises a removing device 30 provided to remove the milking member after the milking operation has been finished. The removing device 30 comprises a removing member 31 attached to the stationary structure 2, and more specifically to the wall 13. It is to be noted that the removing member 31 could also be attached to for instance the mounting device 16. In the embodiments disclosed, the removing member 31 comprises a rotary motor. The removing member 31 may also as an alternative comprise a linear motor, such as a pneumatic or hydraulic cylinder. Furthermore, the removing device 30 comprises a guide member 32 and a line 33, such as a wire, a chain etc. The line 33 extends between and is connected to the removing member 31 and the milking member 5. The guide member 32 is attached to the connecting member 19 and fixed in relation to the support arm 17a, 17b. The guide member is located at a horizontal position lying between a horizontal position of a connection point of the line 33 to the removing member 31 and a horizontal position of a connection point of the line 33 to the milking member 5.

Figure 3:
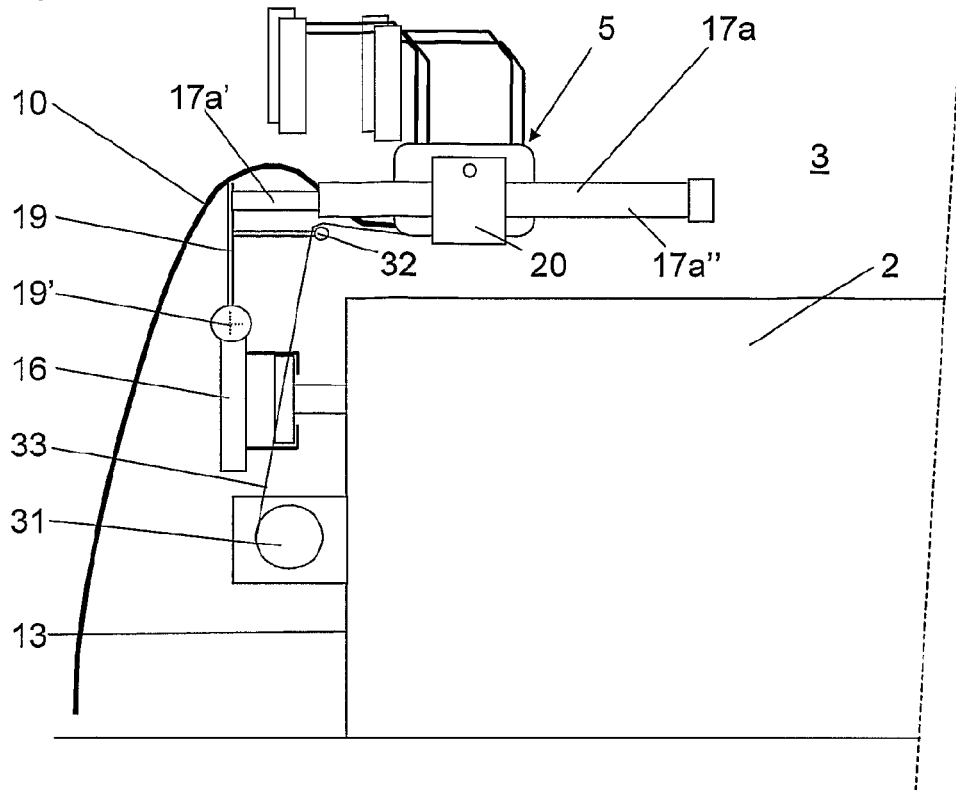
FIG. 3 discloses schematically a side view of the milking device in FIG. 1 in an intermediate position.
Figure 4:
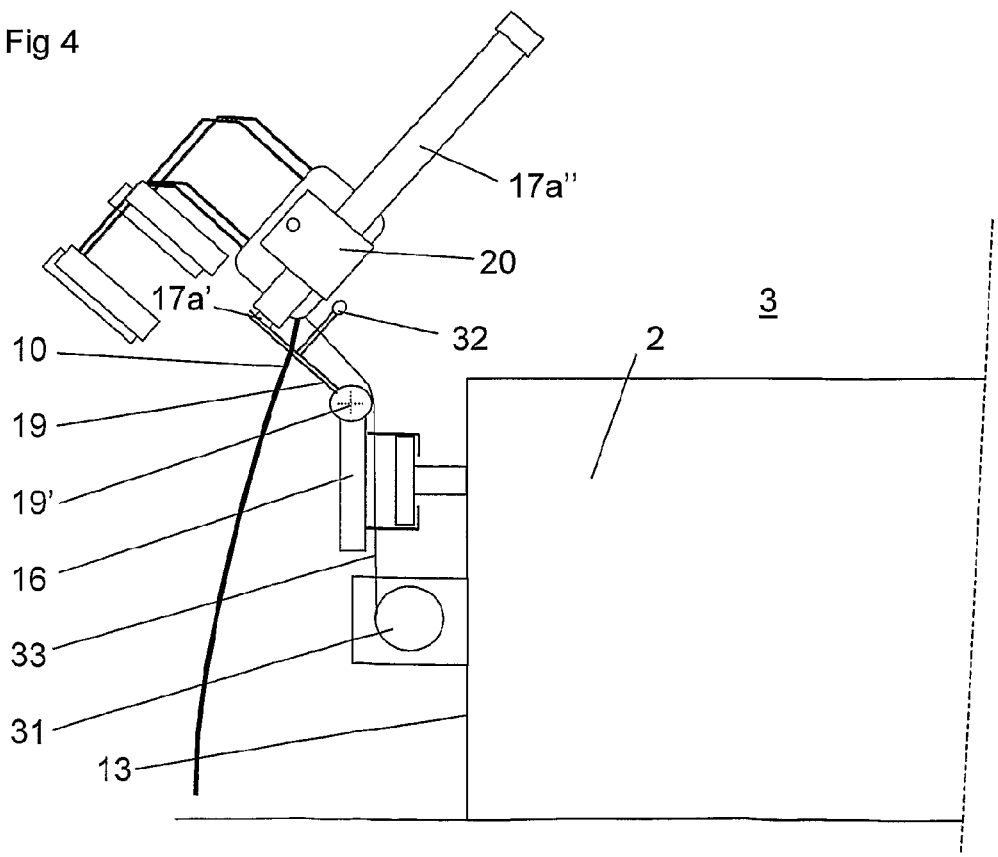
FIG. 4 discloses schematically a side view of the milking device in FIG. 1 in a rest position.

As indicated above, FIG. 1 discloses the milking device 1 in an active milking position in which the milking member is located at an outer end of the support arm and the teatcups 6 may be attached to the teats of the animal (not disclosed). FIG. 3 discloses the milking device 1 in an intermediate position in which the milking member 5 has been displaced on the support arm 17a, 17b, i.e. on the secondary arm element 17a", 17b", away from the outer end and towards an inner end of the support arm 17a, 17b. In the intermediate position disclosed in FIG. 3, also the secondary arm element 17a", 17b" has been displaced on the primary support element towards the inner end of the support arm 17a, 17b. FIG. 4 discloses the milking device 1 in a rest position, in which the milking member 5 is located at the inner end of the support arm 17a, 17b.

As mentioned above, the mounting device 16 with the support arm 17a, 17b and the milking member 5, is freely movable on the rail element 18 during the milking operation, when the milking device 1 is in the active milking position, i.e. the teatcups 6 are attached to the teats. However, it is to be noted that the mounting device 16, with the support arm 17a, 17b and the milking member 5, also may be freely movable along the rail element 18 when the milking device 1 is in the rest position and in the intermediate position.

Furthermore, in the rest position the support arm 17a, 17b has been rotated in a vertical plane with respect to the mounting device 16 so that the support arm 17a, 17b is located completely outside the milking parlour 3, or at least substantially completely outside the milking parlour 3. This rotation of the support arm 17a, 17b, from the active milking position shown in FIG. 1 to the rest position shown in FIG. 4, is facilitated, or possibly even accomplished, by means of the gravity force, since the centre of gravity of the support arm 17a, 17b, slide member 20, the milking member 5 and the long milk conduit 10 will be located closed to or even horizontally outside the point of rotation defined by the rotary joint 19'. Alternatively or additionally, the milking device may also comprise a force element 38 exerting a force acting on the support arm 17a, 17b to facilitate the moving of the support arm 17a, 17b from the active milking position to the rest position. Consequently, in this case the force element 38 may, when the milking member 5 has been moved from the second outer position to the first inner position, overcome the weight of the support arm 17a, 17b, the milking member 5, the slide member 20 and the long milk conduit 10, and rotate the support arm from the active milking position shown in FIG. 1 to the rest position shown in FIG. 4. The force element 38 may comprises any suitable force-exerting member, such as an electrical motor, a pneumatic or hydraulic cylinder or a spring. The spring may, for instance, be a spiral spring incorporated in the rotary joint 19', as indicated in FIG. 1, or a helical spring acting on the support arm 17a, 17b.

The teatcups 6 can be easily attached to the teats of an animal by a milker when the milking device 1 is in the rest position. The milker can then grip two of the teatcups 6 and move them forwardly, i.e. from the position outside the milking parlour 3 to a position beneath the udder and the teats of the animal. This movement is permitted by the rotation of the support arm 17a, 17b around the connecting joint 19' and by the movement of the milking member 5 along the arm axis x. At this position, the teatcups 6 can be slightly lifted onto the respective teats. The animal may then be milked during the milking operation. When the milking operation is finished, the removing device 30 is activated, wherein the milking member 5 is withdrawn from the teats and moved rearwardly to be in the first inner position. At this position the centre of gravity of the milking member 5 and the long milk conduit will be outside the rotary joint 19' so that the support arm 17a, 17b will be rotated back to the rest position shown in FIG. 4, possibly assisted by the force element 38.

FIG. 5 discloses a second embodiment which differs from the first embodiment in that the support arm 17a, 17b, in addition to the primary arm element 17a', 17b' and the secondary arm element 17a'', 17b'', comprises a third intermediate arm element 17a''', 17b'''. The primary arm element 17a', 17b' is telescopically introduceable into and freely movable in the intermediate arm element 17a''', 17b''' along the arm axis x, and the intermediate arm element 17a''', 17b''' is telescopically introduceable into and freely movable in the secondary arm element 17a'', 17b'' along the arm axis x. With such a telescopic support arm 17a, 17b, the total stroke of the support arm 17a, 17b may be further prolonged in comparison with the prior art. Alternatively or additionally, the slide member 20 may be omitted, wherein the milking member 5 is fixedly attached to the outer secondary arm element 17a'', 17b''. In the latter case the milking member 5 is still freely movable along the arm axis x since the secondary arm element 17a'', 17b'' is movable in relation to the primary arm element 17a', 17b' and/or the intermediate arm element 17a''', 17b'''. It should be noted that the support arm 17a, 17b may comprise more than three such telescopic arm elements.

It is to be noted that the support arm 17a, 17b may be arranged to extend between the rear legs of the animal to be milked. The milking member 5 will then follow any lateral movement of the animal during the milking operation thanks to the feature that the mounting device 16 may move freely on the rail element 18. The milking member 5 will also follow any longitudinal forward or rearward movement of the animal during the milking operation thanks to the feature that the milking member 5 may move freely along the support arm 17a, 17b. The latter movement is permitted by means of the slide member being slidable on the secondary arm element 17a'', 17b'' and/or the secondary arm element 17a'', 17b'' being slidable on the primary arm element 17a', 17b'.

The rail element 18 may be mounted in relation to the milking parlour 3 in such way that the rail element 18 extends behind the animal to be milked or beside the animal to be milked. In both cases lateral and/or longitudinal movements of the milking member 5 in relation to the animal are permitted.

The present invention is not limited to the embodiments disclosed but may be varied and modified within the scope of the following claims. The support arm 17a, 17b may instead of having two parallel arms 17a, 17b as shown in FIG. 2 be provided with only one arm. In the embodiments disclosed, the milking member 5 comprises a claw 7. It should be noted that the milking member 5 also may comprise the teatcups 6 and a respective long milk conduit 10 for each teatcup 6, wherein the long milk conduits 10 are directly connected to the respective teatcup 6 permitting so called quarter milking.

The invention claimed is:

1. A milking device for milking an animal during a milking operation when milking takes place, comprising:
    a milking member comprising at least one teatcup to be attached to a teat of the animal to be milked;
    at least one long milk conduit extending from the milking member and adapted to be connected to a milking machine;
    a support device comprising a mounting device adapted to be mounted to a stationary structure, a support arm extending in parallel to an arm axis and connected to the mounting device, and a rotary joint operably connecting the mounting device to the support arm for enabling rotary movement of the support arm in a vertical plane,
    wherein the milking member is attached to the support arm by engaging means which directly engages the milking member in such a way that the milking member is displaceable on the support arm along the arm axis, and wherein the engaging means comprises a slide member holding the milking member and being attached to the support arm to be displaceable along the arm axis,
    wherein the support arm comprises a primary arm element connected to the mounting device and a secondary arm element holding the milking member, and wherein the primary arm element is telescopically introduceable into the secondary arm element, and wherein the secondary arm element is displaceable on the primary arm element along the arm axis,
    wherein the slide member is slideably mounted on the secondary arm element; and
    wherein the milking member is freely movable along the aim axis during the milking operation.

2. A milking device according to claim 1, wherein the support arm provides a first inner position relatively close to the mounting device and a second outer position relatively far away from the mounting device, and wherein the milking member is freely movable between the first inner position and the second outer position.

3. A milking device according to claim 2, wherein the milking member is attached to the support arm in a rest position and an active milking position during the milking operation, and wherein the milking member is adapted to be positioned in the proximity of the first inner position when the support arm is in the rest position and in the proximity of the second outer position when the support arm is in the active milking position.

4. A milking device according to claim 3, wherein movement of the support aim from the active milking position to the rest position is facilitated by the movement of the milking member from the first inner position to the second outer position due to a displacement of the center of gravity of the milking member, the support arm and the long milk conduit.

5. A milking device according to claim 4, wherein the milking device comprises a force element exerting a force acting on the support arm to facilitate the moving of the support arm from the active milking position to the rest position.

6. A milking device according to claim 5, wherein the force element comprises a spring.

7. A milking device according to claim 1, wherein the milking member is attached to the support arm in a rest position and an active milking position during the milking operation.

8. A milking device according to claim 7, wherein the support arm is connected to the mounting device to be movable with respect to the mounting device in order to be positionable in at least the rest position and the active milking position.

9. A milking device according to claim 1, wherein the milking member is pivotally mounted to the support arm for pivotal movement around a pivot axis.

10. A milking device according to claim 9, wherein the pivot axis extends at an angle to the arm axis.

11. A milking device according to claim 9, wherein the support arm includes a first arm and a second arm, wherein the first aim and the second arm both extend in parallel to the arm axis, and wherein the slide member is mounted to the first arm and the second arm to be displaceable along the arm axis.

12. A milking device according to claim 1, wherein the milking member is pivotally mounted to the support arm for pivotal movement around a pivot axis and wherein the milking member is mounted to the slide member in such a way that the milking member is pivotal around the pivot axis.

13. A milking device according to claim 1, wherein the long milk conduit extends from the milking member beside the support arm.

14. A milking device according to claim 1, wherein the support arm comprises a first arm and a second arm, and wherein the first arm and the second arm both extend in parallel to the arm axis.

15. A milking device according to claim 14, wherein both the first arm and the second arm comprise a respective primary arm element connected to the mounting device and a respective secondary arm element holding the milking member, and wherein the primary arm elements are telescopically introduceable into the secondary arm elements, and wherein the secondary arm elements are displaceable on a respective one of the primary arm elements in parallel to the aim axis.

16. A milking device according to claim 1, wherein the milking member comprises a claw and a set of teatcups each having an opening for permitting introduction of a respective teat of the animal to be milked.

17. A milking device according to claim 16, wherein the teatcups are connected to the claw by means of a respective short milk conduit, wherein each short milk conduit has such a stiffness that the teatcups are maintained in a position with the openings turned substantially upwards prior to the milking operation when the claw is below an udder of the animal.

18. A milking device according to claim 17, characterized in that each short milk conduit has a first substantially straight portion connected to the claw and a second substantially straight portion connected to the respective teatcup, the first straight portion being approximately perpendicular to the second straight portion.

* * * * *